United States Patent
Saka et al.

(10) Patent No.: US 8,684,432 B2
(45) Date of Patent: Apr. 1, 2014

(54) ROBOT HAND, ROBOT, AND HOLDING MECHANISM

(71) Applicant: Seiko Epson Corporation, Tokyo (JP)

(72) Inventors: Yoshihisa Saka, Shiojiri (JP); Kazuto Yoshimura, Shimosuwa (JP); Yoshinobu Goto, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/921,456

(22) Filed: Jun. 19, 2013

(65) Prior Publication Data

US 2013/0341945 A1 Dec. 26, 2013

(30) Foreign Application Priority Data

Jun. 20, 2012 (JP) ................. 2012-138480

(51) Int. Cl.
*B25J 15/08* (2006.01)
(52) U.S. Cl.
USPC ............................ 294/119.1; 294/213; 901/39
(58) Field of Classification Search
USPC ................. 294/119.1, 2, 86.4, 207, 213, 106; 901/31, 36, 39; 623/57, 64
See application file for complete search history.

(56) References Cited

U.S. PATENT DOCUMENTS

| | | | |
|---|---|---|---|
| 3,306,646 A * | 2/1967 | Flora, Jr. .......................... 294/2 |
| 4,653,793 A * | 3/1987 | Guinot et al. ................. 294/86.4 |
| 4,768,428 A * | 9/1988 | Silvestrini et al. ............... 99/551 |
| 6,264,419 B1 | 7/2001 | Schinzel |
| 7,370,896 B2 * | 5/2008 | Anderson et al. ............. 294/106 |
| 2003/0102640 A1 | 6/2003 | Saito |
| 2006/0263270 A1 | 11/2006 | Rizzotte et al. |
| 2012/0175903 A1 | 7/2012 | Murakami et al. |

FOREIGN PATENT DOCUMENTS

| | | |
|---|---|---|
| EP | 0 060 896 A1 | 9/1982 |
| JP | 61-019577 | 1/1986 |
| JP | 05-220687 | 8/1993 |
| JP | 07-205080 | 8/1995 |
| JP | 11-033969 | 2/1999 |
| JP | 2004-223676 A | 8/2004 |
| JP | 2010-201538 A | 9/2010 |
| JP | 2012-143835 A | 8/2012 |
| WO | WO-2005-065264 A2 | 7/2005 |

OTHER PUBLICATIONS

Extended European Search Report for Application No. EP 13 17 2474 dated Dec. 20, 2013 (4 pages).

* cited by examiner

*Primary Examiner* — Stephen Vu
(74) *Attorney, Agent, or Firm* — Harness, Dickey & Pierce, P.L.C.

(57) ABSTRACT

Fingers for holding a target project from shift members, and shift in accordance with the movement of the shift members shifted in predetermined axial directions by a shift mechanism to hold the target. Sliding members for shifting the shift members in the predetermined axial directions project from the shift members, and guide the shift members by sliding. According to this structure, a robot hand becomes smaller in size by decreasing the clearances between the fingers (moving the shift members closer to each other). Thus, the robot hand can hold a small target object within a small work space even though the robot hand conducts a parallel shift of the fingers.

20 Claims, 14 Drawing Sheets

ROBOT HAND, ROBOT, AND HOLDING MECHANISM

BACKGROUND

1. Technical Field

The present invention relates to a robot hand, a robot, and a holding mechanism.

2. Related Art

There are two known robot hand holding systems for holding a target object using a plurality of fingers: holding the target by rotation of the roots of the fingers (for example, JP-A-2010-201538), and holding the target by a parallel shift of the fingers (for example, JP-A-5-220687).

According to the method which rotates the roots of the fingers, the contact angle of the fingers for contact with the target change according to the size of the target to be held, in which case the shape and force of the fingers need to change for each of the targets. Accordingly, this method requires complicated structure and control of the robot hand. Concerning this point, however, the method which conducts a parallel shift of the fingers does not vary the contact angle of the fingers for contact with the target, and thus can simplify the structure and control of the robot hand.

Despite of this advantage, the method of conducting a parallel shift of the fingers has a limitation in that the method is difficult to use for holding a small target. This limitation is imposed for the following reasons. In general, holding a small target takes place in a narrow working space. For example, in the case of picking up small parts and assembling the parts to predetermined positions, the parts to be assembled are often arranged within a small space with only small clearances between one another. In this case, there is generally only a limited space therebetween for receiving the robot hand for picking up the parts. Moreover, for the attachment of the picked-up parts, the parts often need to be assembled in a small space in accordance with the small size of the parts. On the other hand, the robot hand of the type conducting a parallel shift of the fingers has large components for supporting the movable fingers, therefore the robot hand has an increased size and thus is difficult to use for working in a narrow working space.

SUMMARY

An advantage of some aspects of the invention is to provide a robot hand, a robot, and a holding mechanism, which are constructed to hold a target by a parallel shift of fingers but are compact and suited for a work performed in a narrow working space.

A robot hand according to an aspect of the invention includes: a plurality of fingers which hold a target by changing the clearances between the fingers; a center member having a driving mechanism for shifting the plural fingers; a plurality of first peripheral members spaced apart from the surfaces of the center member in a first direction; first driving shafts projecting in the first direction from the first peripheral members and connecting with the driving mechanism; a plurality of second peripheral members spaced apart from the surfaces of the center member in a second direction crossing the first direction; second driving shafts projecting in the second direction from the second peripheral member and connecting with the driving mechanism; shift members disposed in the second direction with respect to the first peripheral members and in the first direction with respect to the second peripheral members, and carrying or supporting the fingers; first sliding shafts projecting in the first direction from the shift members and inserted into first sliding bores formed in the second peripheral members so as to slide in the first sliding bores; second sliding shafts projecting in the second direction from the shift members and inserted into second sliding bores formed in the first peripheral members so as to slide in the second sliding bores; and a second center sliding shaft projecting in the second direction from at least one of the second peripheral members and inserted into a second center sliding bore formed in the center member so as to slide in the second center sliding bore.

According to the robot hand of the aspect of the invention having this structure, the distance between the first peripheral members disposed in the first direction with the center member interposed therebetween can be changed by driving the first driving shafts using the driving mechanism housed within the center member. On the other hand, the distance between the second peripheral members disposed in the second direction with the center member interposed therebetween can be changed by driving the second driving shafts. The shift members are disposed in four positions located in the second direction with respect to the first peripheral members and in the first direction with respect to the second peripheral members. The fingers are attached to the shift members. The first sliding shafts are extended in the first direction from the shift members and inserted into the first sliding bores formed in the second peripheral members so as to slide in the first sliding bores. The second sliding shafts are extended in the second direction and inserted into the second sliding bores formed in the first peripheral members so as to slide in the second sliding bores. Furthermore, the second center sliding shaft is projected in the second direction from the second peripheral member and inserted into the second center sliding bore of the center member so as to slide in the second center sliding bore. According to this structure, the robot hand becomes larger when holding a large target, and becomes smaller when holding a small target. Thus, the robot hand can hold a small target within a narrow working space even though the robot hand conducts a parallel shift of the fingers (and the shift members) and holds a target. Moreover, the robot hand which holds a target by conducting a parallel shift of the fingers (and the shift members) need not change the contact angle of the fingers for contact with the target in accordance with the size of the target.

In the robot hand of the aspect of the invention described above, the cross-sectional shape of the second center sliding shaft in the direction perpendicular to the insertion direction may be polygonal, and the shape of the second center sliding bore in the direction perpendicular to the insertion direction may be polygonal (such as quadrangular, triangular, and pentagonal shapes).

According to this structure, the second center sliding shaft inserted into the second center sliding bore does not rotate within the second center sliding bore. Thus, rotation of the second peripheral members connecting with the second center sliding shaft can be avoided. The shift members and the fingers connect with the second peripheral members via the first sliding shafts. In this case, the fingers receive a reaction force in the first direction from the target when the robot hand holds the target in the first direction. This reaction force is transmitted through the first sliding shafts to the second peripheral members, and acts in a direction so as to rotate the second peripheral members around the second center sliding shaft. However, according to this aspect of the invention, the cross-sectional shape of the second center sliding shaft in the direction perpendicular to the insertion direction is polygonal, and the shape of the second center sliding bore in the direction perpendicular to the insertion direction is polygonal. These configurations can prevent the rotation of the second peripheral members. Accordingly, the rigidity of the robot hand when holding the target in the first direction can increase.

In the robot hand of the aspect of the invention described above, plural second center sliding shafts and plural second center sliding bores may be provided.

When plural second center sliding shafts and plural second center sliding bores are provided, rotation of the second peripheral members can be further avoided. Accordingly, the rigidity of the robot hand can improve.

In the robot hand of the aspect of the invention described above, the second center sliding shaft may project from each of the second peripheral members spaced apart from the surfaces of the center member in the second direction.

According to this structure, generation of a force twisting the target (shearing force) can be prevented when the target is held by a large force in the first direction. The details of this mechanism will be explained below.

In the robot hand of the aspect of the invention described above may further include a first center sliding shaft projecting in the first direction from at least one of the first peripheral members and inserted into a first center sliding bore formed in the center member so as to slide in the first center sliding bore.

According to this structure, generation of a force twisting the target (shearing force) can be prevented when the target is held by a large force in the second direction.

In the robot hand of the aspect of the invention described above, the cross-sectional shape of the first center sliding shaft in the direction perpendicular to the insertion direction may be polygonal, and the shape of the first center sliding bore in the direction perpendicular to the insertion direction may be polygonal.

According to this structure, the first peripheral member connected with the first center sliding shaft does not rotate around the first center sliding shaft. Therefore, this structure can prevent rotation of the first peripheral members around the first center sliding shaft caused by a reaction force applied in the second direction from the target to the fingers when the robot hand holds the target in the second direction. Accordingly, the rigidity of the robot hand holding the target in the second direction can improve.

In the robot hand of the aspect of the invention described above, plural first center sliding shafts and plural first center sliding bores may be provided.

When plural first center sliding shafts and plural first center sliding bores are provided, rotation of the first peripheral members can be further avoided. Accordingly, the rigidity of the robot hand can further improve.

The invention can also be practiced in the form of a robot having the robot hand described above. That is, a robot according to another aspect of the invention includes: a plurality of fingers which hold a target by changing the clearances between the fingers; a center member having a driving mechanism for shifting the plural fingers; a plurality of first peripheral members spaced apart from the surfaces of the center member in a first direction; first driving shafts projecting in the first direction from the first peripheral members and connecting with the driving mechanism; a plurality of second peripheral members spaced apart from the surfaces of the center member in a second direction crossing the first direction; second driving shafts projecting in the second direction from the second peripheral member and connecting with the driving mechanism of the center member; shift members disposed in the second direction with respect to the first peripheral members and in the first direction with respect to the second peripheral members, and carrying or supporting the fingers; first sliding shafts projecting in the first direction from the shift members and inserted into first sliding bores formed in the second peripheral members so as to slide in the first sliding bores; second sliding shafts projecting in the second direction from the shift members and inserted into second sliding bores formed in the first peripheral members so as to slide in the second sliding bores; and a second center sliding shaft projecting in the second direction from at least one of the second peripheral members and inserted into a second center sliding bore formed in the center member so as to slide in the second center sliding bore.

According to this aspect of the invention, the robot can hold a small target within a narrow working space. Moreover, the robot which holds a target by conducting a parallel shift of the fingers (and the shift members) need not change the contact angle of the fingers for contact with the target in accordance with the size of the target.

In the robot of the aspect of the invention described above, the cross-sectional shape of the second center sliding shaft in the direction perpendicular to the insertion direction may be polygonal, and the shape of the second center sliding bore in the direction perpendicular to the insertion direction may be polygonal (such as quadrangular, triangular, and pentagonal shapes) similarly to the robot hand of the above aspect of the invention.

According to this structure, the second peripheral member connecting with the second center sliding shaft does not rotate in the direction perpendicular to the insertion direction. Accordingly, the rigidity of the robot hand when holding the target in the first direction can increase.

In the robot of the above aspect of the invention described above, plural second center sliding shafts and plural second center sliding bores may be provided similarly to the robot hand of the above aspect of the invention.

When plural second center sliding shafts and plural second center sliding bores are provided, rotation of the second peripheral members can be further avoided. Accordingly, the rigidity of the robot hand mounted on the robot can improve.

In the robot hand of the aspect of the invention described above, the second center sliding shaft may project from each of the second peripheral members spaced apart from the surfaces of the center member in the second direction similarly to the robot hand of the above aspect of the invention.

According to this structure, generation of a force twisting the target (shearing force) can be prevented when the target is held by a large force in the first direction. The details of this mechanism will be explained below.

The robot of the aspect of the invention described above further may include a first center sliding shaft projecting in the first direction from at least one of the first peripheral members and inserted into a first center sliding bore formed in the center member so as to slide in the first center sliding bore.

According to this structure, generation of a force twisting the target (shearing force) can be prevented when the target is held by a large force in the second direction.

In the robot of the above aspect of the invention, the cross-sectional shape of the first center sliding shaft in the direction perpendicular to the insertion direction may be polygonal, and the shape of the first center sliding bore in the direction perpendicular to the insertion direction may be polygonal similarly to the robot hand of the above aspect of the invention.

According to this structure, the first peripheral member connected with the first center sliding shaft does not rotate around the first center sliding shaft. Therefore, this structure can prevent rotation of the first peripheral members around the first center sliding shaft caused by a reaction force applied in the second direction from the target to the fingers when the robot holds the target in the second direction using the robot hand. Accordingly, the rigidity of the robot holding the target in the second direction can improve.

In the robot of the above aspect of the invention described above, plural first center sliding shafts and plural first center sliding bores may be provided.

When plural first center sliding shafts and plural first center sliding bores are provided, rotation of the first peripheral members can be further avoided. Accordingly, the rigidity of the robot hand when the robot holding the target can further improve.

The invention can also be practiced in the form of a mechanism (or holding mechanism) which allows the robot hand described above to hold a target. That is, a holding mechanism according to still another aspect of the invention includes: a plurality of contact members which hold a target by changing the clearances between the contact members; a center member having a driving mechanism for shifting the plural fingers; a plurality of first peripheral members spaced apart from the surfaces of the center member in a first direction; first driving shafts projecting in the first direction from the first peripheral members and connecting with the driving mechanism; a plurality of second peripheral members spaced apart from the surfaces of the center member in a second direction crossing the first direction; second driving shafts projecting in the second direction from the second peripheral member and connecting with the driving mechanism of the center member; shift members disposed in the second direction with respect to the first peripheral members and in the first direction with respect to the second peripheral members, and carrying or supporting the contact members; first sliding shafts projecting in the first direction from the shift members and inserted into first sliding bores formed in the second peripheral members so as to slide in the first sliding bores; second sliding shafts projecting in the second direction from the shift members and inserted into second sliding bores formed in the first peripheral members so as to slide in the second sliding bores; and a second center sliding shaft projecting in the second direction from at least one of the second peripheral members and inserted into a second center sliding bore formed in the center member so as to slide in the second center sliding bore.

According to the above aspect of the invention, the holding mechanism can hold a small target within a narrow working space. Moreover, the holding mechanism which holds a target by conducting a parallel shift of the fingers (and the shift members) need not change the contact angle for contact with the fingers in accordance with the size of the target. Thus, the holding mechanism is applicable to various types of structures other than the robot hand as long as they have the function of holding a target.

In the holding mechanism of the aspect of the invention described above, the cross-sectional shape of the second center sliding shaft in the direction perpendicular to the insertion direction may be polygonal, and the shape of the second center sliding bore in the direction perpendicular to the insertion direction may be polygonal (quadrangular, triangular, pentagonal, or other shapes).

According to this structure, rotation of the second peripheral member connected with the second center sliding shaft can be avoided. Accordingly, the rigidity when the target is held in the first direction can increase.

In the holding mechanism of the aspect of the invention described above, plural second center sliding shafts and plural second center sliding bores may be provided.

When plural second center sliding shafts and plural second center sliding bores are provided, rotation of the second peripheral members can be further avoided. Accordingly, the rigidity of the holding mechanism can improve.

In the holding mechanism of the aspect of the invention described above, the second center sliding shaft may project from each of the second peripheral members spaced apart from the surfaces of the center member in the second direction.

According to this structure, generation of a force twisting the target (shearing force) can be prevented when the target is held by a large force in the first direction. The details of this mechanism will be described below.

The holding mechanism of the aspect of the invention may further include a first center sliding shaft projecting in the first direction from at least one of the first peripheral members and inserted into a first center sliding bore formed in the center member so as to slide in the first center sliding bore.

According to this structure, generation of a force twisting the target (shearing force) can be prevented when the target is held by a large force in the second direction.

In the holding mechanism of the aspect of the invention described above, plural first center sliding shafts and plural first center sliding bores may be provided.

When plural first center sliding shafts and plural first center sliding bores are provided, rotation of the first peripheral members can be further avoided. Accordingly, the rigidity of the holding mechanism holding the target can further improve.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

For clarifying the details of the invention, an embodiment according to the invention is hereinafter described in the following order.

A. Structure of Robot Hand of Embodiment
B. Holding Operation of Robot Hand of Embodiment
C. Function of Center Sliding Shafts
D. Configuration of End Member
E. Modified Examples
E-1. First Modified Example
E-2. Second Modified Example
E-3. Third Modified Example
F. Application Examples

A. STRUCTURE OF ROBOT HAND OF EMBODIMENT

Figure 1:
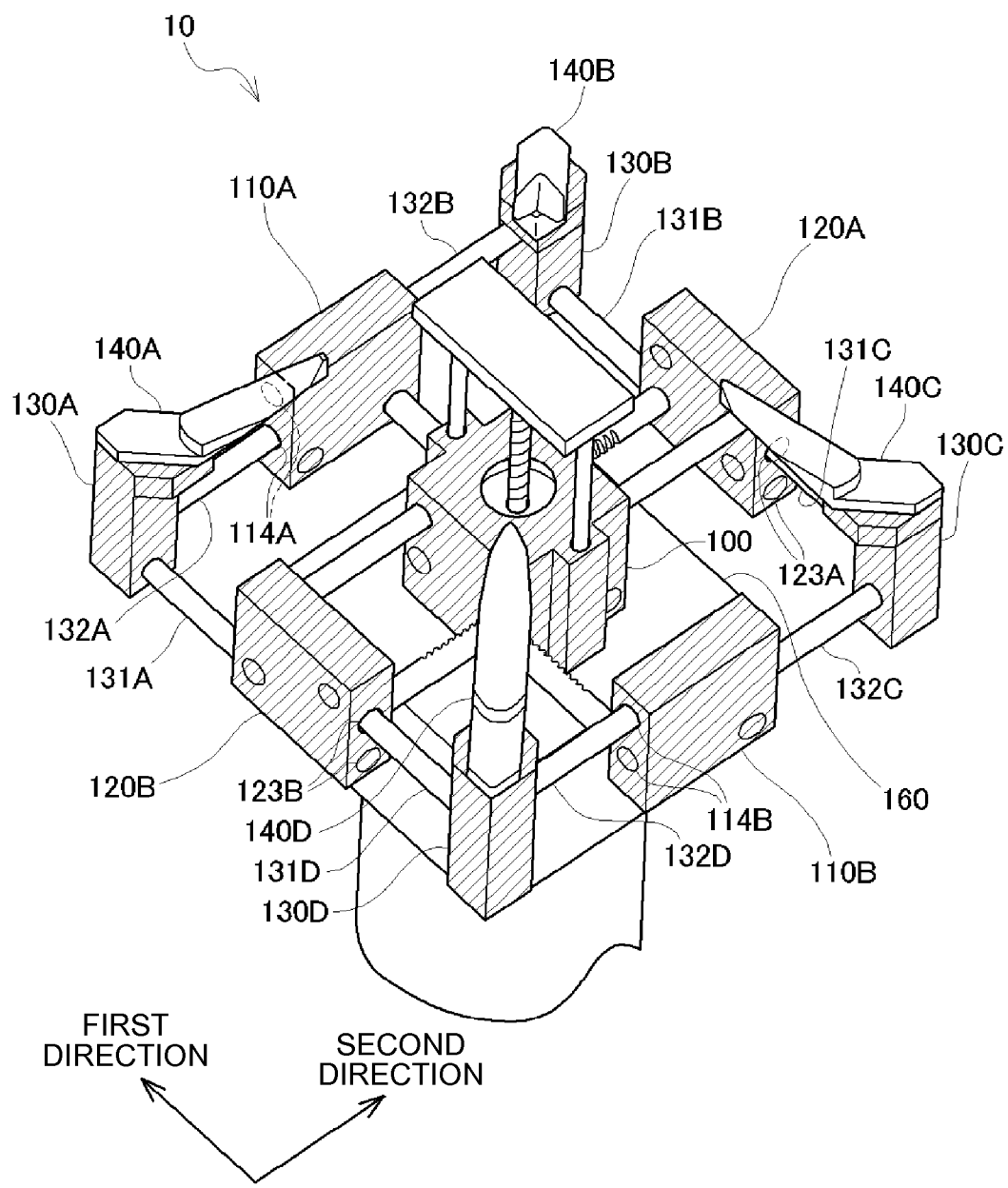
FIG. 1 is a perspective view illustrating the structure of a robot hand according to an embodiment.
Figure 2:
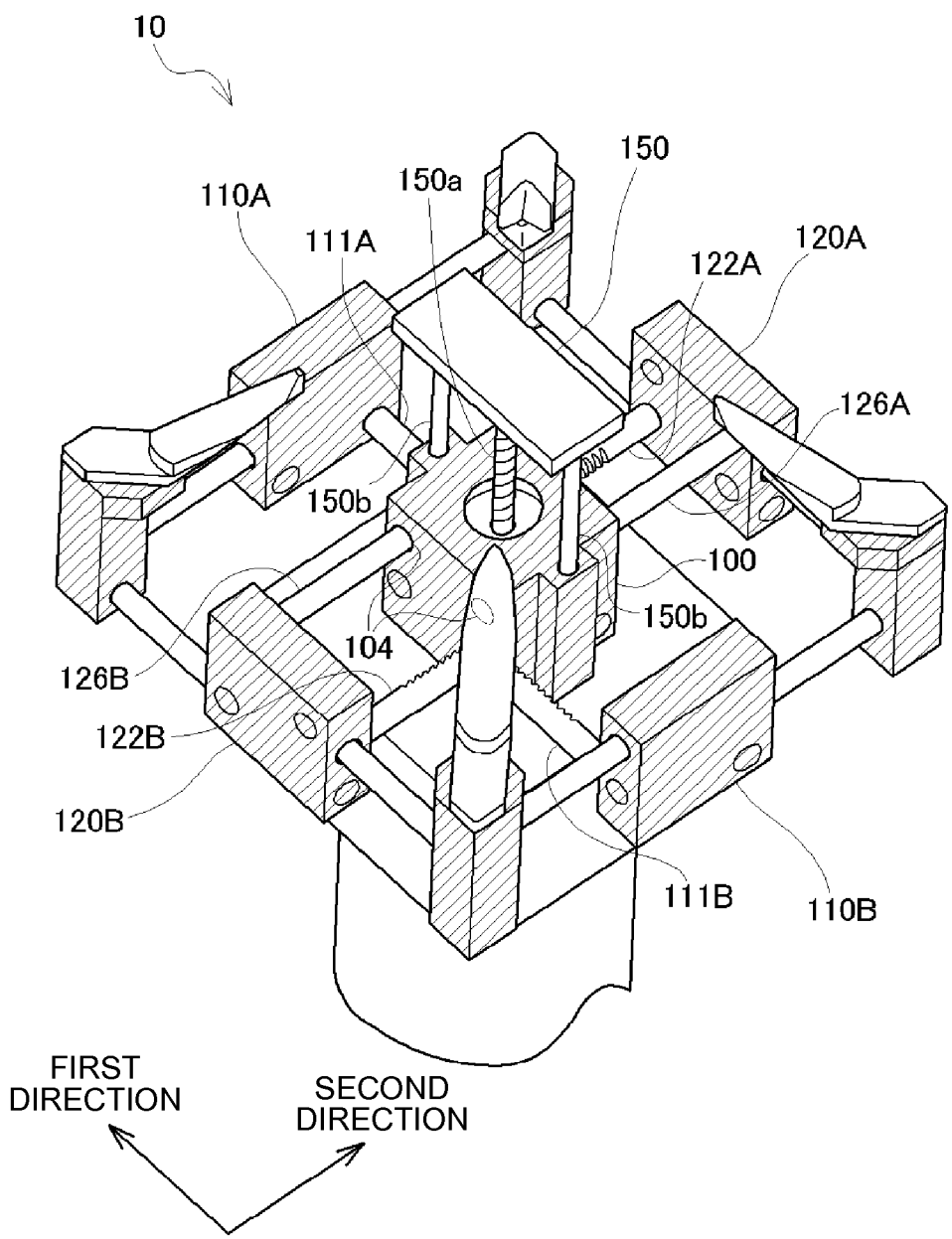
FIG. 2 is a perspective view illustrating the structure of the robot hand according to the embodiment.

FIGS. 1 and 2 illustrate the structure of a robot hand 10 according to this embodiment. As can be seen from FIG. 1, the robot hand 10 in this embodiment includes a plurality of members, racks and sliding parts for connecting the members, and others. Initially, the structures of the respective members are explained. In FIG. 1, the members correspond to hatched parts. The robot hand 10 in this embodiment includes two first peripheral members 110A and 110B between which a center member 100 provided on a base case 160 is sandwiched in a first direction, two peripheral members 120A and 120B between which the center member 100 is sandwiched in a second direction, and four shift members 130A though 130D.

The shift member 130A is disposed in a position so as to lie in the first direction with respect to the second peripheral member 120B, and in the second direction with respect to the first peripheral member 110A. The shift member 130B is disposed in a position so as to lie in the first direction with respect to the second peripheral member 120A, and in the second direction with respect to the first peripheral member 110A. The shift member 130C is disposed in a position so as to lie in the first direction with respect to the second peripheral member 120A, and in the second direction with respect to the first peripheral member 110A. The shift member 130D is disposed in a position so as to lie in the first direction with respect to the second peripheral member 120B, and in the second direction with respect to the first peripheral member 110A. Fingers 140A through 140D are attached to the shift members 130A through 130D, respectively.

Each of the shift members 130A through 130D has a sliding shaft extending in the first direction, and a sliding shaft extending in the second direction. More specifically, the shift member 130A has a first sliding shaft 131A projecting in the first direction, and a second sliding shaft 132A projecting in the second direction. The first sliding shaft 131A is inserted into a first sliding bore 123B penetrating the second peripheral member 120B in the first direction so as to slide in the bore 123B, while the second sliding shaft 132A is inserted into a second sliding bore 114A penetrating the first peripheral member 110A in the second direction so as to slide in the bore 114A. The shift member 130B has a first sliding shaft 131B projecting in the first direction, and a second sliding shaft 132B projecting in the second direction. The first sliding shaft 131B is inserted into a first sliding bore 123A penetrating the second peripheral member 120A in the first direction so as to slide in the bore 123A, while the second sliding shaft 132B is inserted into the second sliding bore 114A penetrating the first peripheral member 110A in the second direction so as to slide in the bore 114A. Similarly, the shift member 130C has a first sliding shaft 131C projecting in the first direction, and a second sliding shaft 132C projecting in the second direction. The first sliding shaft 131C is inserted into the first sliding bore 123A penetrating the second peripheral member 120A in the first direction so as to slide in the bore 123A, while the second sliding shaft 132C is inserted into a second sliding bore 114B penetrating the first peripheral member 110B in the second direction so as to slide in the bore 114B. The shift member 130D has a first sliding shaft 131D projecting in the first direction, and a second sliding shaft 132D projecting in the second direction. The first sliding shaft 131D is inserted into the first sliding bore 123B penetrating the second peripheral member 120B in the first direction so as to slide in the bore 123B, while the second sliding shaft 132D is inserted into the second sliding bore 114B penetrating the first peripheral member 110B in the second direction so as to slide in the bore 114B.

As illustrated in FIG. 2, a first driving shaft 111B projects in the first direction from the first peripheral member 110B. The first driving shaft 111B has gear teeth in the side surface thereof, and constitutes a rack and pinion mechanism in combination with a pinion gear provided within the center member 100. Similarly, a first driving shaft 111A having gear teeth in the side surface thereof projects in the first direction from the first peripheral member 110A. The first driving shaft 111A also constitutes a rack and pinion mechanism in combination with the pinion gear provided within the center member 100. The internal structure of the center member 100 will be described below.

A second driving shaft 122A projects in the second direction from the second peripheral member 120A. The second driving shaft 122A also has gear teeth in the side surface thereof, and constitutes a rack and pinion mechanism in combination with the pinion gear provided within the center member 100. Similarly, a second driving shaft 122B having gear teeth in the side surface thereof projects in the second direction from the second peripheral member 120B. The second driving shaft 122B also constitutes a rack and pinion mechanism in combination with the pinion gear provided within the center member 100.

A second center sliding shaft 126B projects in the second direction from the second peripheral member 120B. The second center sliding shaft 126B is inserted into a second center sliding bore 104 penetrating the center member 100 in the second direction so as to slide in the bore 104. Similarly, a second center sliding shaft 126A projects in the second direction from the second peripheral member 120A. The second center sliding shaft 126A is inserted into the second center sliding bore 104 penetrating the center member 100 in the second direction so as to slide in the bore 104.

A screw shaft 150*a* having a screw in the outer circumferential surface thereof projects from the center of the top surface of the center member 100. An end member 150 having a flat plate shape is attached to the tip of the screw shaft 150*a*. The screw shaft 150*a* is connected with a driving mechanism (not-shown but described below) equipped within the center member 100. Sliding shafts 150*b* project from the top surface of the center member 100 on both sides of the screw shaft 150*a* so as to slide in the center member 100. The tips of the sliding shafts 150*b* are attached to the end member 150. The end member 150 has a width that is smaller in the second direction than in the first direction. The base case 160 is attached to link units 312 of a robot arm.

Figure 3A:
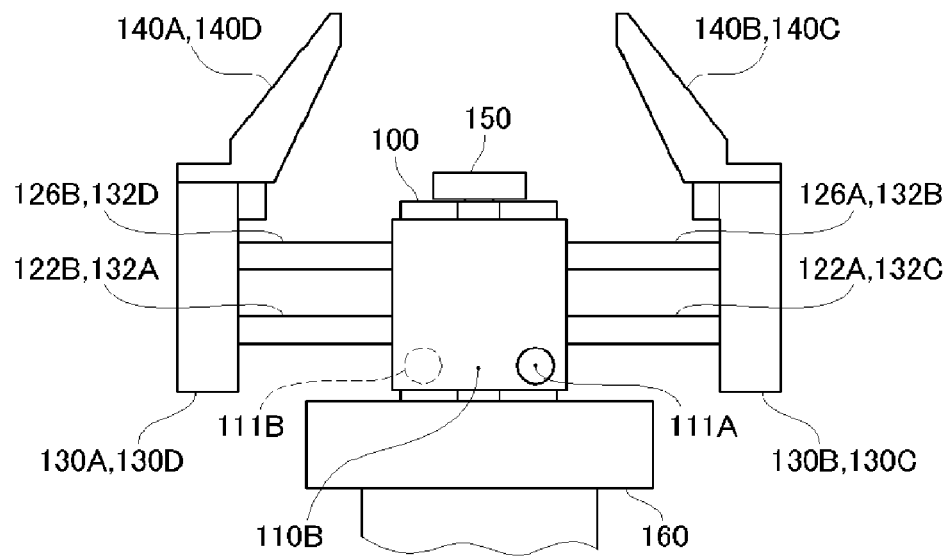
FIGS. 3A and 3B are side views illustrating the structure of the robot hand according to the embodiment.
Figure 3B:
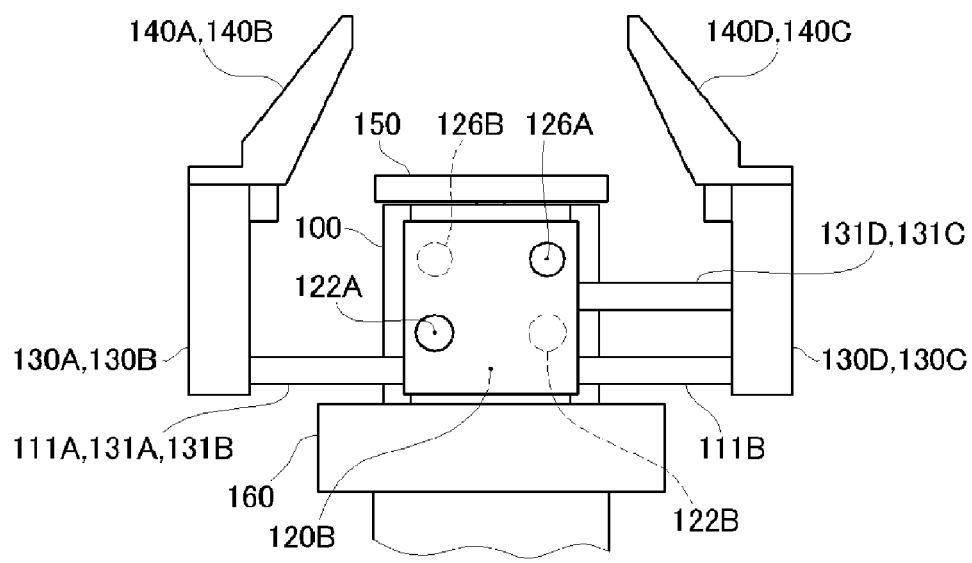

FIGS. 3A and 3B illustrate the positional relationship between the first driving shafts 111A and 111B, the second driving shafts 122A and 122B, the second center sliding shafts 126A and 126B, the first sliding shafts 131A through 131D, and the second sliding shafts 132A through 132D in the height direction as viewed from the side of the robot hand 10 in this embodiment. FIG. 3A is a side view of the robot hand 10 as viewed in the first direction from the side of the first peripheral member 110B. FIG. 3B is a side view of the robot hand 10 as viewed in the second direction from the side of the second peripheral member 120B.

As illustrated in the figures, the first driving shafts 111A and 111B, the second driving shafts 122A and 122B, the second center sliding shafts 126A and 126B, the first sliding shafts 131A through 131D, and the second sliding shafts 132A through 132D are arranged in four layers. The first driving shafts 111A and 111B and the first sliding shafts 131A and 131B are disposed in the layer closest to the base case 160 (hereinafter referred to as a first layer). The second driving shafts 122A and 122B and the second sliding shafts 132A and 132C are disposed on a layer immediately above the first layer (hereinafter referred to as a second layer). The first sliding shafts 131C and 131D are disposed on a layer immediately above the second layer (hereinafter referred to as a third layer). The second center sliding shafts 126A and 126B and the second sliding shafts 132B and 132D are disposed on the uppermost layer (hereinafter referred to as a fourth layer).

B. HOLDING OPERATION OF ROBOT HAND OF EMBODIMENT

Figure 4A:
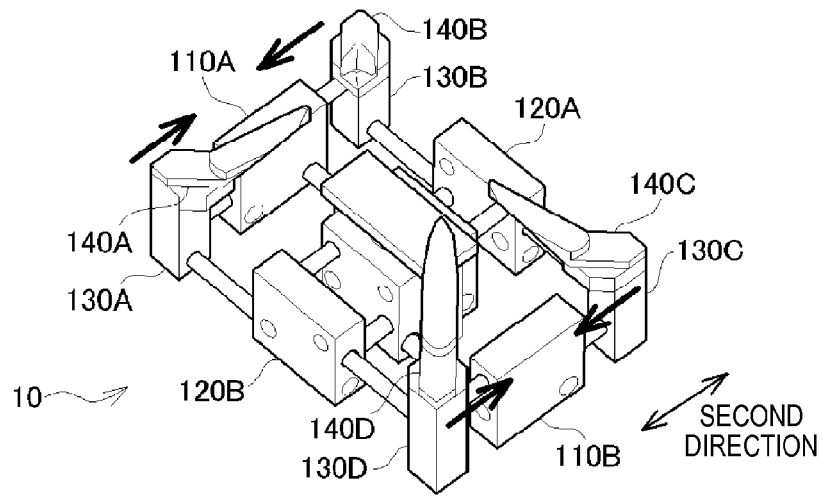
FIGS. 4A through 4C illustrate the operation of the robot hand according to the embodiment.
Figure 4B:
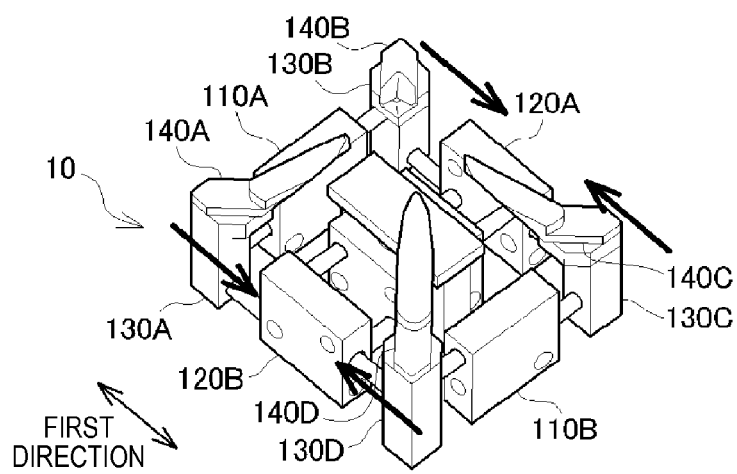
Figure 4C:
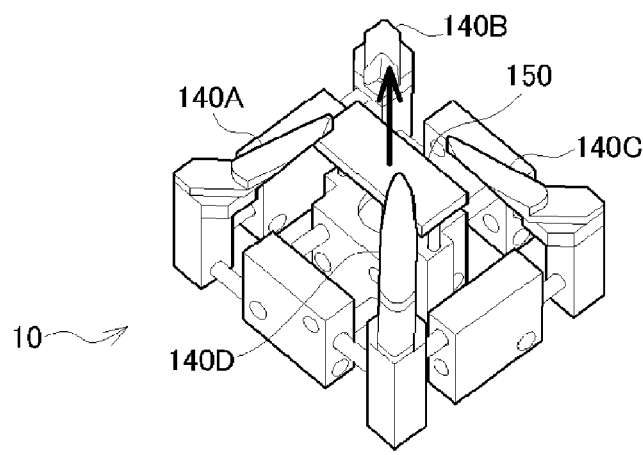

FIGS. 4A through 4C illustrate the operation of the robot hand 10 according to this embodiment when holding a target. For holding the target, the size of the robot hand 10 in the width direction is varied in accordance with the size of the target to be held. It is assumed herein that the width direction corresponds to the second direction. However, the width direction may be defined as the first direction. FIG. 4A shows a process for changing of the size of the robot hand 10 in the width direction. As noted above, the second sliding shafts 132A through 132D extending in the second direction from the shift members 130A through 130D are inserted into the second sliding bores 114A and 114B formed in the first peripheral members 110A and 110B so as to slide in the bores 114A and 114B (see FIG. 1). According to this structure, the clearance between the shift member 130A and the shift member 130B, and the clearance between the shift member 130D and the shift member 130C can be simultaneously varied by changing the clearance between the second peripheral member 120A and the second peripheral member 120B. The fingers 140A through 140D are attached to the top surfaces of the shift members 130A through 130D. Thus, the fingers 140A through 140D attached to the shift members 130A through 130D can be moved by shifting the shift members 130A through 130D. The driving mechanism for changing the clearance between the second peripheral member 120B and the second peripheral member 120A will be described below. FIG. 4A shows a process for decreasing the clearance.

After adjustment of the size of the robot hand 10 in the width direction, the next process decreases the size of the robot hand 10 in the holding direction in accordance with the size of the target. It is assumed herein that the holding direction corresponds to the first direction. However, the holding direction may be defined as the second direction. FIG. 4B shows a process for decreasing the size of the robot hand 10 in the holding direction. As noted above, the first sliding shafts 131A through 131D extending in the first direction from the shift members 130A through 130D are inserted into the first sliding bores 123A and 123B formed in the second peripheral members 120A and 120B so as to slide in the bores 123A and 123B (see FIG. 1). According to this structure, the clearance between the shift member 130A and the shift member 130D, and the clearance between the shift member 130B and the shift member 130C can be varied by changing the clearance between the first peripheral member 110A and the first peripheral member 110B. Accordingly, the clearance between the finger 140A and the finger 140D, and the clearance between the finger 140B and the finger 140C can be simultaneously decreased to hold the target. The mechanism for reducing the clearance between the first peripheral member 110A and the first peripheral member 110B will be described below.

According to the robot hand 10 in this embodiment, the top surface of the end member 150 can be brought into contact with the target by shifting the end member 150 in the up-down direction. In this case, the four fingers 140A through 140D and the end member 150 can hold the target, and the target can be maintained in a stable condition even when the target is a small object. FIG. 4C illustrates the end member 150 shifted upward.

The driving mechanism which varies the size of the robot hand 10 in the first direction or the second direction, and shifts the end member 150 in the up-down direction is now explained.

Figure 5:
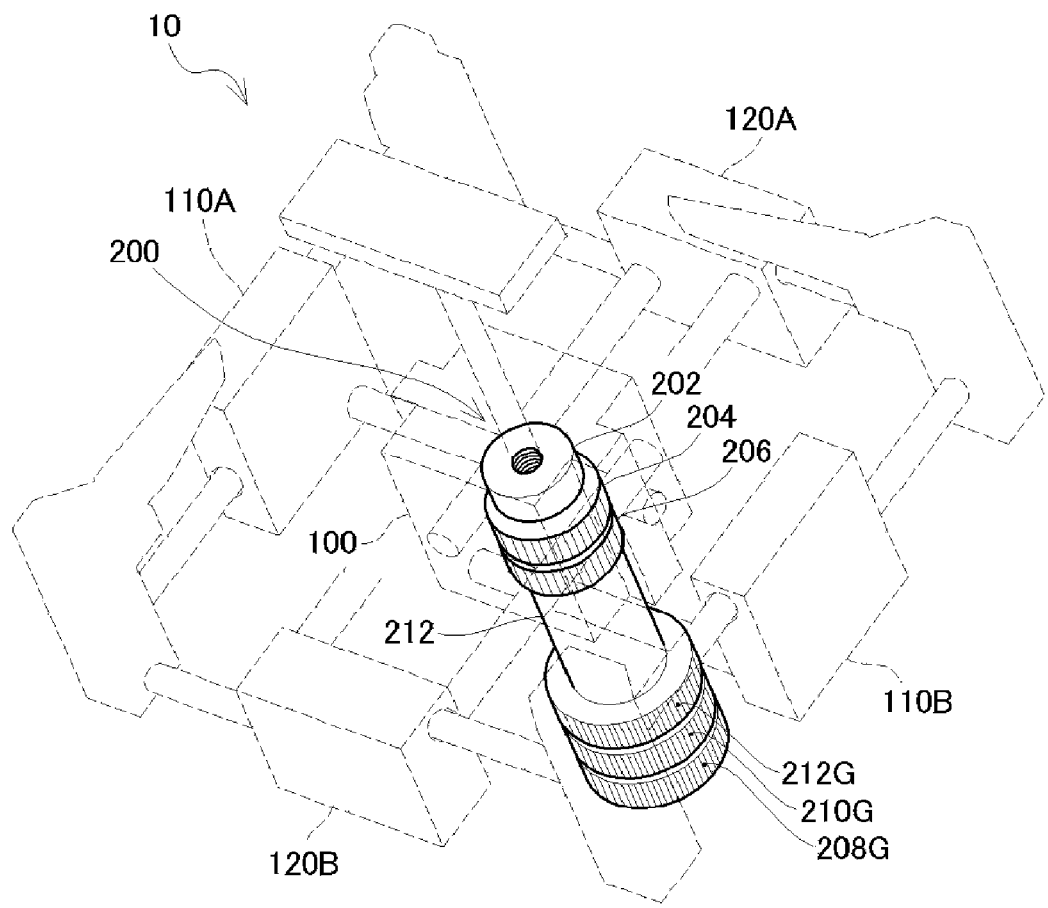
FIG. 5 illustrates the structure of a driving mechanism of the robot hand according to the embodiment.

FIG. 5 illustrates a driving mechanism 200 positioned on the robot hand 10 according to this embodiment. FIG. 5 shows only the driving mechanism 200 and a piezoelectric motor driving the driving mechanism 200 by solid lines, and shows the other components by broken lines representing only the outlines of the external shapes thereof for avoiding complication of the figure.

The driving mechanism 200 in this embodiment has a triple-pipe-shaped structure which includes three transmission shafts assembled coaxially with each other. A hollow and round-pipe-shaped second transmission shaft 212 is provided as an outermost transmission shaft of the driving mechanism 200. A second pinion gear 206 is provided on the outer circumference of the upper end of the second transmission shaft 212. A driving gear 212G is attached to the lower end of the second transmission shaft 212.

A hollow (not-shown) and round-pipe-shaped first transmission shaft 210 (see FIG. 6B) is housed within the second transmission shaft 212 so as to be rotatable relative to the second transmission shaft 212. The first transmission shaft 210 is longer than the second transmission shaft 212. A first pinion gear 204 is provided on the outer circumference of the upper end of the first transmission shaft 210, while a driving gear 210G is attached to the lower end of the first transmission shaft 210. The second pinion gear 206 and the first pinion gear 204 have the same outside diameter.

A hollow (not-shown) and round-pipe-shaped third transmission shaft 208 (see FIG. 6C) is housed within the first transmission shaft 210 so as to be rotatable relative to the first transmission shaft 210. The third transmission shaft 208 is further longer than the first transmission shaft 210. A screw portion 202 having a screw in the inside surface thereof is provided on the outer circumference of the upper end of the third transmission shaft 208. A driving gear 208G is provided at the lower end of the third transmission shaft 208. The screw portion 202 engages with the screw shaft 150a connected with the end member 150.

Substantially the upper half of the driving mechanism 200 thus constructed is housed within the center member 100, while substantially the lower half of the driving mechanism 200 is housed within the base case 160. The base case 160 further accommodates a driving motor (not-shown) for driving the driving gear 212G of the second transmission shaft 212, a driving motor (not-shown) for driving the driving gear 210G of the first transmission shaft 210, a driving motor (not-shown) for driving the driving gear 208G of the third transmission shaft 208, and others.

Figure 6A:
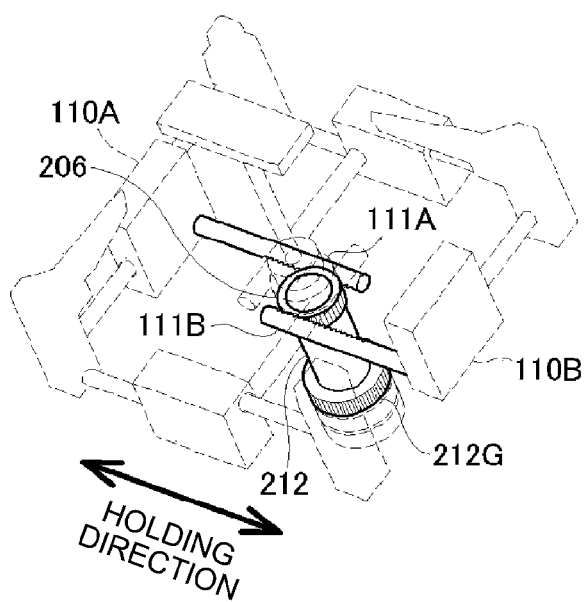
FIGS. 6A through 6C illustrate the operation of the driving mechanism according to the embodiment.
Figure 6B:
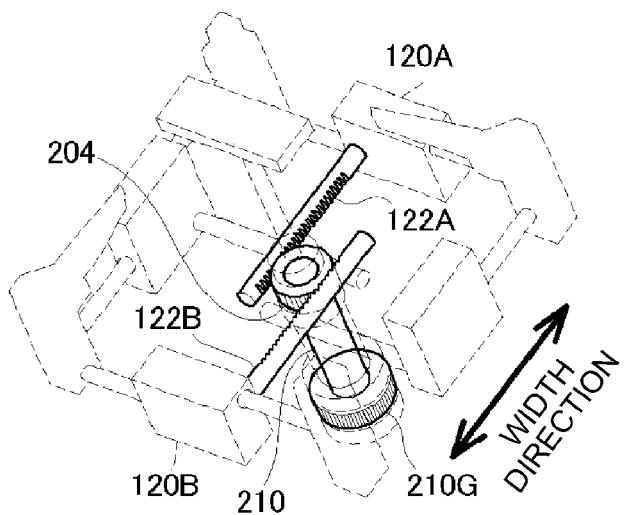
Figure 6C:
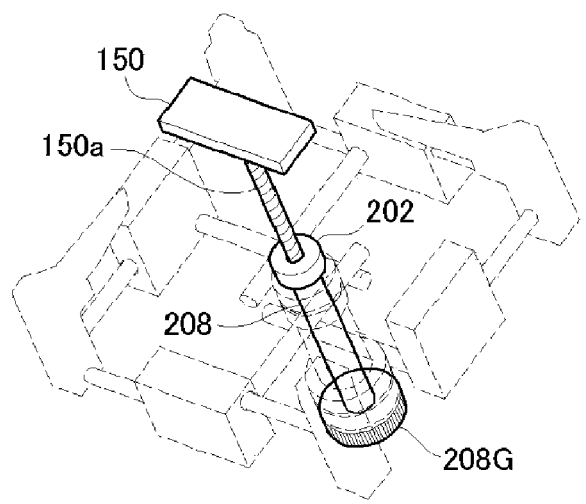

FIGS. 6A through 6C illustrate the operation for varying the size of the robot hand 10 in the first direction and the second direction, and the operation for shifting the end member 150 in the up-down direction according to this embodiment. FIG. 6A shows a process for driving the driving gear 212G of the second transmission shaft 212. FIG. 6A shows the components associated with the operation by bold solid lines, and shows the other parts by fine broken lines for avoiding complication of the drawing.

As illustrated in the figure, the second transmission shaft 212 rotates in response to driving of the driving gear 212G, whereby the second pinion gear 206 at the upper end of the second transmission shaft 212 rotates. The second pinion gear 206 engages with the first driving shafts 111A and 111B. The first driving shaft 111A connects with the first peripheral member 110A, while the first driving shaft 111B connects with the first peripheral member 110B. According to this structure, the clearance between the first peripheral member 110A and the first peripheral member 110B (clearance in the first direction, i.e., the holding direction in this embodiment) changes by the rotation of the second pinion gear 206. For example, when the second pinion gear 206 rotates clockwise in FIG. 6A, the first peripheral member 110A and the first peripheral member 110B shift in directions so as to decrease the clearance therebetween. On the other hand, when the second pinion gear 206 rotates anticlockwise, the first peripheral member 110A and the first peripheral member 110B shift in directions so as to increase the clearance therebetween.

FIG. 6B shows a process for driving the driving gear 210G of the first transmission shaft 210. Similarly to FIG. 6A, FIG. 6B shows the components associated with the operations by bold solid lines, and shows the other parts by fine broken lines for avoiding complication of the drawing. The first transmission shaft 210 rotates in response to driving of the driving gear 210G, whereby the first pinion gear 204 at the upper end of the first transmission shaft 210 rotates. The first pinion gear 204 engages with the second driving shafts 122A and 122B. The second driving shaft 122A connects with the second peripheral member 120A, while the second driving shaft 122B connects with the second peripheral member 120B. According to this structure, the clearance between the second peripheral member 120A and the second peripheral member 120B (clearance in the second direction, i.e., the width direction in this embodiment) changes by the rotation of the first pinion gear 204. For example, when the first pinion gear 204 rotates clockwise in FIG. 6B, the second peripheral member 120A and the second peripheral member 120B shift in directions so as to increase the clearance therebetween. On the other hand, when the first pinion gear 204 rotates anticlockwise, the second peripheral member 120A and the second peripheral member 120B shift in directions so as to decrease the clearance therebetween.

FIG. 6C shows a process for driving the driving gear 208G of the third transmission shaft 208. Similarly to FIGS. 6A and 6B, FIG. 6C shows the components associated with the operations by bold solid lines, and shows the other parts by fine broken lines for avoiding complication of the drawing. The third transmission shaft 208 rotates in response to driving of the driving gear 208G, whereby the screw portion 202 at the upper end of the third transmission shaft 208 rotates. The screw portion 202 engages with the screw shaft 150a. The upper end of the screw shaft 150a connects with the end member 150. Moreover, the sliding shafts 150b extended from the upper surface of the center member 100 are attached to the end member 150. According to this structure, the end member 150 can shift in the up-down direction relative to the center member 100, but cannot rotate relative thereto. Therefore, with rotation of the screw portion 202, the screw shaft 150a engaging with the screw portion 202 shifts in the up-down direction, and the end member 150 shifts in the up-down direction accordingly. In the case of the example shown in FIG. 6C, the end member 150 shifts downward when the screw portion 202 rotates clockwise, and shifts upward when the screw portion 202 rotates anticlockwise.

C. FUNCTION OF CENTER SLIDING SHAFTS

According to the robot hand 10 in this embodiment described herein, the second center shafts 126A and 126B are extended in the second direction from the second peripheral members 120A and 120B, and inserted into the second center sliding bores 104 of the center member 100 so as to slide in the bores 104. The second center sliding shafts 126A and 126B have the function of preventing the target from receiving a force so as to twist the target (shearing force) when the target is held by a large force. The details of this point are now explained.

Figure 7A:
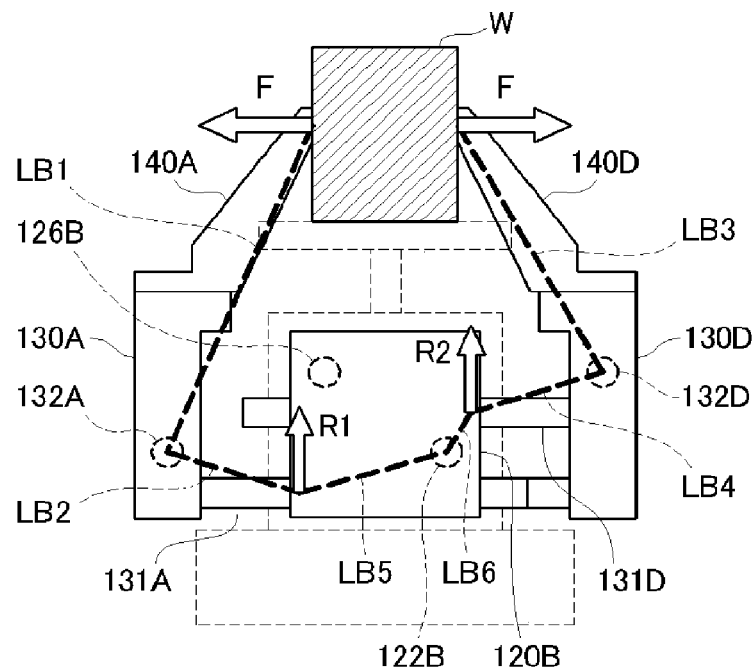
FIGS. 7A and 7B illustrate the function of second center sliding shafts.
Figure 7B:
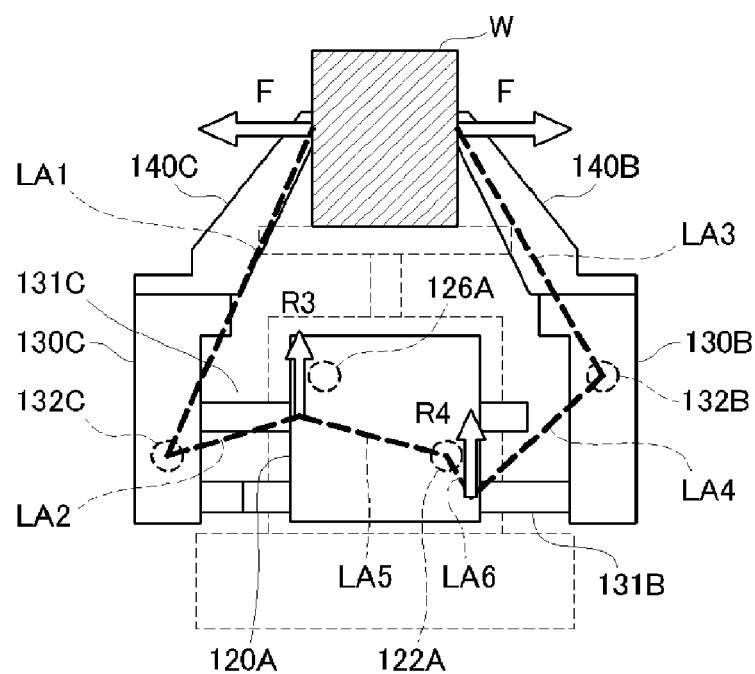

FIGS. 7A and 7B illustrate the function of the second center sliding shafts 126A and 126B. FIG. 7A is a side view of the robot hand 10 holding a target W as viewed in the second direction from the side of the second peripheral member 120B. For focusing the explanation on the fingers 140A and 140D, the shift members 130A and 130D, and the second peripheral member 120B, FIG. 7A shows the parts associated with these components by bold solid lines, and shows the other parts by fine broken lines.

Initially, concerning the finger 140A and the shift member 130A, the finger 140A receives a reaction force F from the target W. In this case, the finger 140A and the shift member 130A try to rotate around the second sliding shaft 132A (anticlockwise rotation in FIG. 7A). As a result, a force R1 is generated at the position of contact between the first sliding shaft 131A and the second peripheral member 120B and tries to rotate the second peripheral member 120B (clockwise rotation in FIG. 7A). The force R1 is calculated as F×LB1/LB2 (see FIG. 7A for LB1 and LB2) based on the balance of moments.

As for the finger 140D and the shift member 130D, the finger 140D receives the reaction force F from the target W. In this case, the finger 140D and the shift member 130D try to rotate around the second sliding shaft 132D (clockwise rotation in FIG. 7A). As a result, a force R2 is generated at the position of contact between the first sliding shaft 131D and the second peripheral member 120B and tries to rotate the second peripheral member 120B (anticlockwise rotation in FIG. 7A). The force R2 is calculated as F×LB3/LB4 (see FIG. 7A for LB3 and LB4) based on the balance of moments.

As apparent from FIG. 7A, a distance LB5 between the point of application of the force R1 and the second driving shaft 122B is longer than a distance LB6 between the point of application of the force R2 and the second driving shaft 122B when compared with one another. Thus, the second peripheral member 120B tries to rotate clockwise in FIG. 7A around the second driving shaft 122B. The moment of this rotation is calculated as R1×LB5−R2×LB6.

The operation of the fingers 140B and 140C on the second peripheral member 120A side is substantially similar to the operation of the fingers 140A and 140D on the second peripheral member 120B side described above. FIG. 7B shows the side view of the robot hand 10 holding the target W as viewed in the second direction from the side of the second peripheral member 120A. For focusing the explanation on the fingers 140B and 140C, the shift members 130B and 130C, and the second peripheral member 120A, FIG. 7B shows the parts associated with these components by bold solid lines, and shows the other parts by fine broken lines.

As illustrated in FIG. 7B, the finger 140C also receives the reaction force F from the target W. In this case, the finger 140C and the shift member 130C try to rotate around the second sliding shaft 132C (anticlockwise rotation in FIG. 7B). As a result, a force R3 is generated at the position of contact between the first sliding shaft 131C and the second peripheral member 120A and tries to rotate the second peripheral member 120A (clockwise rotation in FIG. 7B). The force R3 is calculated as F×LA1/LA2 (see FIG. 7B for LA1 and LA2) based on the balance of moments.

Concerning the finger 140B and the shift member 130B, the finger 140B receives the reaction force F from the target W. In this case, the finger 140B and the shift member 130B try to rotate clockwise around the second sliding shaft 132B. As a result, a force R4 is generated at the position of contact between the first sliding shaft 131B and the second peripheral member 120A and tries to rotate the second peripheral member 120A anticlockwise. The force R4 is calculated as F×LA3/LA4 (see FIG. 7B for LA3 and LA4) based on the balance of moments.

As apparent from FIG. 7B, a distance LA5 between the point of application of the force R3 and the second driving shaft 122A is longer than a distance LA6 between the point of application of the force R4 and the second driving shaft 122A when compared with one another. Thus, the second peripheral member 120A tries to rotate clockwise in FIG. 7B around the second driving shaft 122A. The moment of this rotation is calculated as R3×LA5−R4×LA6.

Figure 8:
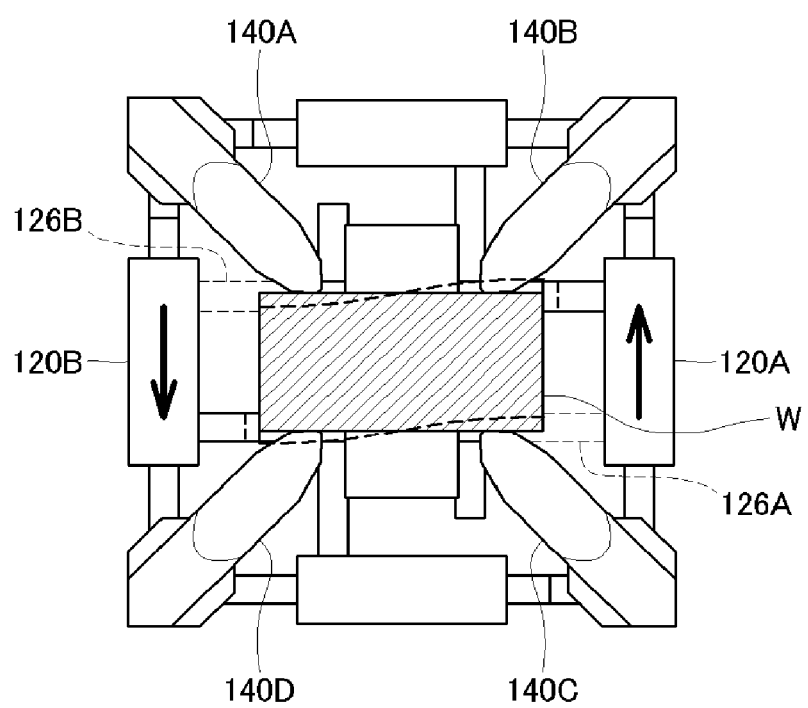
FIG. 8 is a top view of the robot hand, illustrating the function of the second center sliding shafts.

FIG. 8 is a top view of the robot hand 10 holding the target W. As described with reference to FIGS. 7A and 7B, the second peripheral member 120B tries to rotate downward in FIG. 8, while the second peripheral member 120A tries to rotate upward in FIG. 8. Accordingly, when the target W is held by a large force, a force twisting the target W (shearing force) may be generated. According to the robot hand 10 in this embodiment, however, the second center sliding shaft 126A extends from the second peripheral member 120A, and supports the second peripheral member 120A trying to rotate around the second driving shaft 122A by the generated force. Similarly, the second center sliding shaft 126B extends from the second peripheral member 120B, and supports the second peripheral member 120B trying to rotate around the second driving shaft 122B by the generated force. This structure prevents rotations of the second peripheral members 120A and 120B in the opposite directions (see FIG. 8), thereby avoiding generation of the force twisting the target W (shearing force) even when the target W is held by a large force.

Figure 9A:
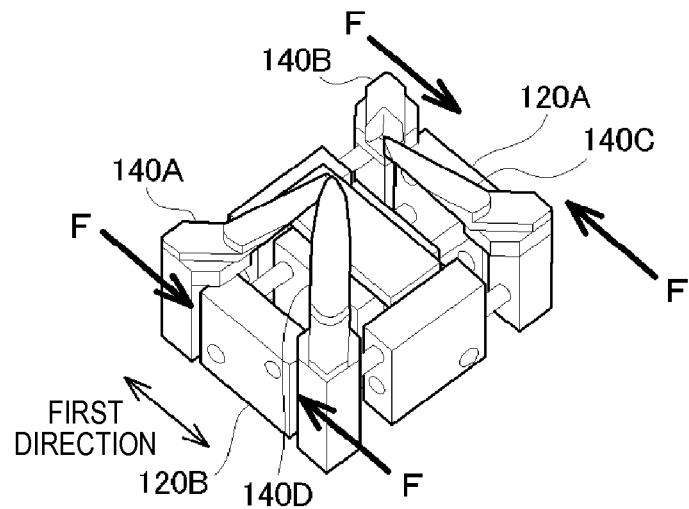
FIGS. 9A and 9B show advantages of the presence of the second center sliding shafts in conjunction with results of an experiment.
Figure 9B:
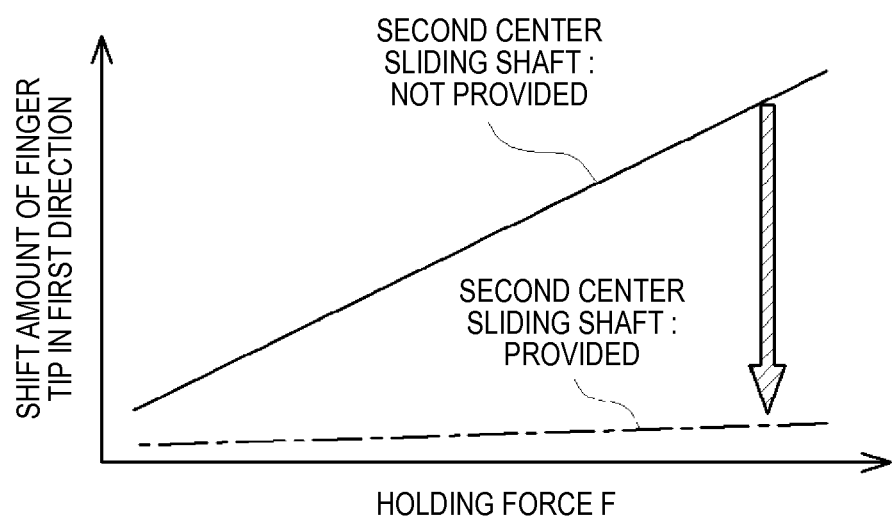

FIGS. 9A and 9B illustrate the advantages produced by the presence of the second center sliding shafts 126A and 126B based on the result of an experiment. According to this experiment, the finger 140A and the finger 140D are brought into contact with each other, and the finger 140B and the finger 140C are brought into contact with each other in the first step (see FIG. 9A). In this condition, the finger 140A and the finger 140D are pressed against each other, and simultaneously the finger 140B and the finger 140C are pressed against each other, whereby a reaction force acts on each of the fingers 140A through 140D. As a result, the second peripheral member 120A tries to rotate clockwise in FIG. 9A, and the second peripheral member 120B rotates anticlockwise in FIG. 9A by the mechanism explained with reference to FIGS. 7A and 7B. Accordingly, the position of contact between the finger 140A and the finger 140D and the position of contact between the finger 140B and the finger 140C shift in the first direction. The amount of this shift increases as the pressing force between the finger 140A and the finger 140D (corresponding to the holding force F of the target W) and the pressing force between the finger 140B and the finger 140C (corresponding to the holding force F) become larger.

FIG. 9B shows the amount of the shift measured by the actual measurement while varying the pressing force (holding force F) for the structure provided with the second center sliding shafts 126A and 126B and the structure not provided with the second center sliding shafts 126A and 126B. As apparent from the result in the figure, the amount of the shift considerably decreases by the presence of the second center sliding shafts 126A and 126B. It is therefore concluded that the robot hand 10 having the second center sliding shafts 126A and 126B in this embodiment can prevent generation of the force twisting the target W (shearing force) even when the target W is held by a large force.

D. CONFIGURATION OF END MEMBER

As illustrated in FIGS. 1 and 2, the robot hand 10 in this embodiment has the end member 150 configured to be shorter in the second direction than in the first direction. Accordingly, the target W can be securely held even when the target W is a small and thin-plate-shaped object. The reasons for this advantage are herein explained.

When the thin-plate-shaped target W has a sufficient width, the thin-plate-shaped target W can be held by decreasing the clearances between the fingers 140A through 140D in the first direction with the clearances between the fingers 140A through 140D in the second direction widened. Since the clearances of the fingers 140A through 140D in the second direction are sufficiently long, the fingers 140A through 140D do not interfere with the end member 150 even at the time of rise of the end member 150 for supporting the target W. Thus, the end member 150 can rise until contact with the target W.

On the other hand, when the target W having a thin-plate shape and a small width (small size) is held, the clearances between the fingers 140A through 140D in the first direction are decreased with the clearances between the fingers 140A through 140D in the second direction also decreased for a certain amount. Since the clearances between the fingers 140A through 140D in the second direction are small, there is a possibility of interference between the end member 150 and the fingers 140A through 140D at the time of rise of the end member 150 for supporting the target W. When the end member 150 is not raised up to contact with the target W due to the interference, the target W cannot be sufficiently held.

According to the robot hand 10 in this embodiment, however, the end member 150 has a small width in the second direction. In this case, even when the clearances between the fingers 140A through 140D in the second direction are small, the end member 150 does not easily interfere with the fingers 140A through 140D. Therefore, the target W can be securely held by the support of the end member 150 even when the target W is a thin-plate-shaped small object.

Moreover, according to the robot hand 10 in this embodiment, the direction where the shorter sides of the end member 150 extend (second direction) agrees with the direction where the second center sliding shafts 126A and 126B project. In this case, the target W is not broken by a shearing force even when the target is a thin-plate-shaped small object and held by a large force.

Figure 10A:
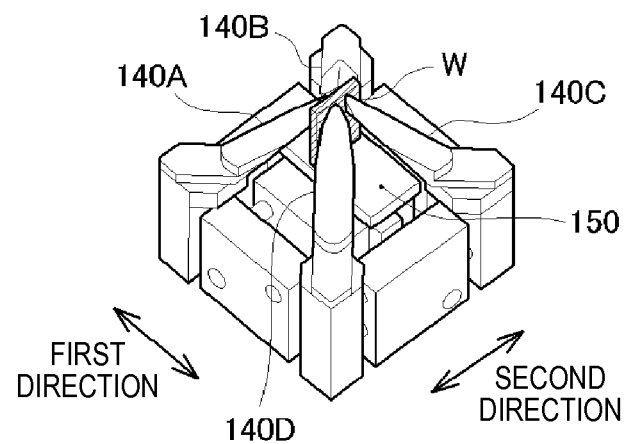
FIGS. 10A and 10B are views for explaining the reasons why a robot hand 10 of the embodiment can hold a thin-plate-shaped small target W by a large force.
Figure 10B:
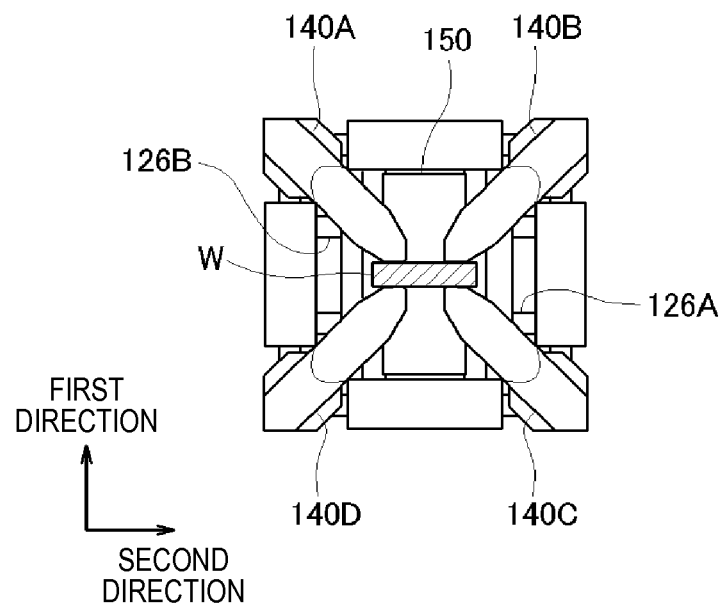

FIGS. 10A and 10B are views for explaining the reasons why the robot hand 10 in this embodiment can hold the thin-plate-shaped small target W by a large force. FIG. 10A shows a condition where the robot hand 10 in this embodiment holds the thin-plate-shaped target W. As can be seen from the figure, the end member 150 has shorter sides in the second direction. In this case, when the clearance between the finger 140A and the finger 140D (clearance in the first direction) and the clearance between the finger 140B and the finger 140C (clearance in the first direction) are considerably decreased, the end member 150 can pass through the space between the fingers 140A and the finger 140B and the space between the finger 140D and the finger 140C. Accordingly, the end member 150 does not easily interfere with the fingers 140A through 140D even at the time of rise.

FIG. 10B is a top view of the robot hand 10 holding the thin-plate-shaped small target W. When the second center sliding shafts 126A and 126B are not provided, a force twisting the target W (shearing force) is generated as discussed with reference to FIG. 8. In this case, the target W may be broken by the shearing force produced when the thin-plate-shaped target W is held by a large force as illustrated in FIG. 10B. According to the robot hand 10 in this embodiment provided with the second center sliding shafts 126A and 126B, however, there is no possibility of damage to the thin-plate-shaped target W through avoidance of generation of the force twisting the target W (shearing force) even when the target W is held by a large force.

E. MODIFIED EXAMPLES

E-1. First Modified Example

Figure 11A:
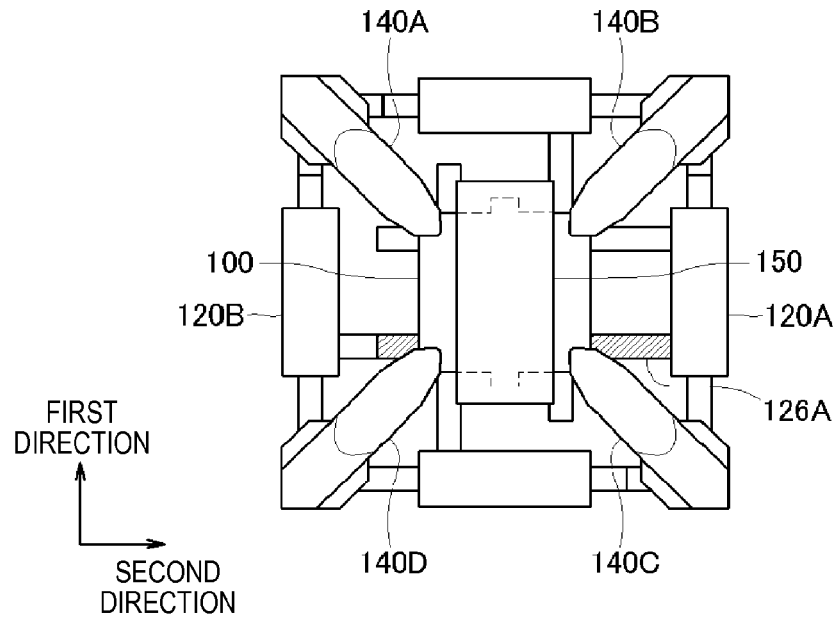
FIGS. 11A and 11B illustrate an example of a robot hand according to a first modified example.

According to the robot hand 10 in this embodiment described herein, the two second center sliding shafts 126A and 126B are provided in the second direction. However, either one of the two second center sliding shafts 126A and 126B may be eliminated. For example, the robot hand 10 is allowed to have only the second center sliding shaft 126A (or only the second center sliding shaft 126B) as illustrated in FIG. 11A. When at least the second center sliding shaft 126A (or the second center sliding shaft 126B) is equipped as in this structure, a force twisting the target W (shearing force W) is not applied similarly to the embodiment.

Figure 11B:
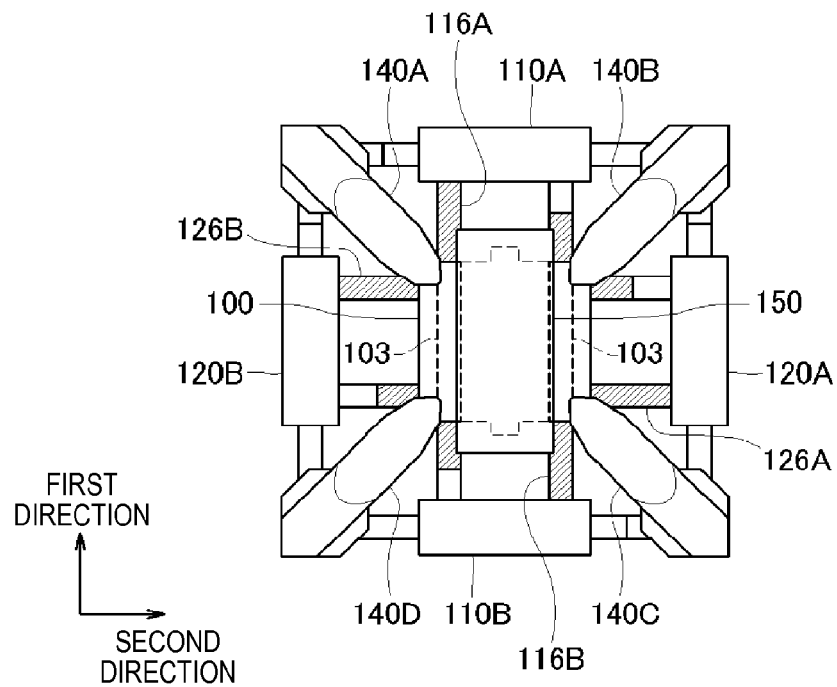

According to the robot hand 10 in this embodiment, components corresponding to the second center sliding shafts 126A and 126B are not provided in the first direction. However, shafts similar to the second center sliding shafts 126A and 126B (hereinafter referred to as first center sliding shafts) may also be equipped in the first direction as shown in FIG. 11B. More specifically, a first center sliding shaft 116A extending in the first direction from the first peripheral member 110A is inserted into a first center sliding bore 103 formed in the center member 100 so as to slide in the bore 103. Similarly, a first center sliding shaft 116B extending in the first direction from the first peripheral member 110B is inserted into the first center sliding bore 103 formed in the center member 100 so as to slide in the bore 103. According to this structure, generation of a force twisting the target (shearing force) is avoided when the target is held in the second direction.

E-2. Second Modified Example

Figure 12:
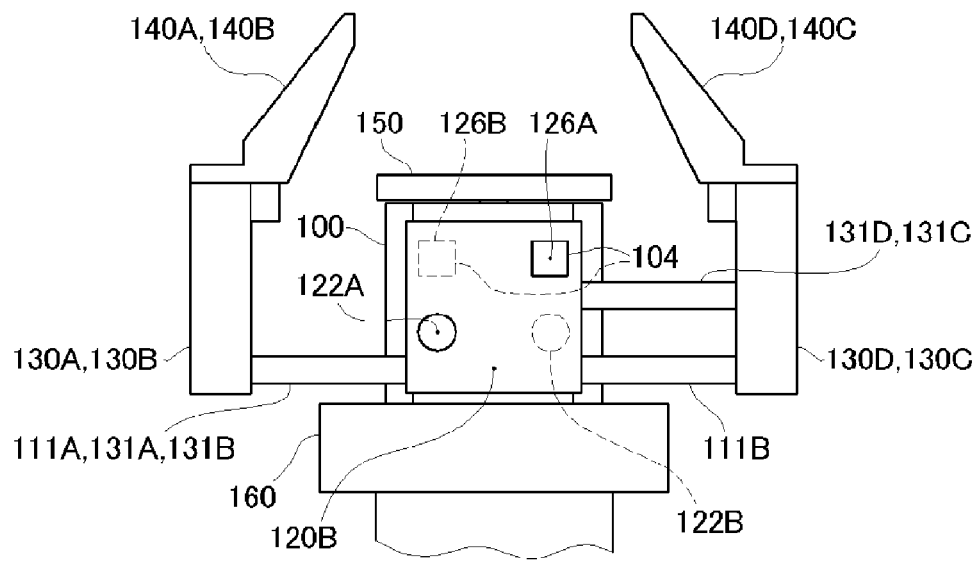
FIG. 12 illustrates an example of a robot hand according to a second modified example.

According to the embodiment described herein, each of the second center sliding shafts 126A and 126B and the center sliding bores 104 receiving the second center sliding shafts 126A and 126B has a round shape in the direction perpendicular to the insertion direction. However, these shapes are not limited to round shapes but may be polygonal shapes. For example, as illustrated in FIG. 12, the cross-sectional shapes of the second center sliding shafts 126A and 126B in the direction perpendicular to the insertion direction, and the shapes of the second center sliding bores 104 in the direction perpendicular to the insertion direction may be quadrangular shapes.

According to this structure, rotation of the second center sliding shafts 126A and 126B within the second center sliding bores 104 is regulated, and the rigidity of the robot hand 10 at the time of hold of the target in the first direction increases. When the first center sliding shafts 116A and 116B are equipped, the cross-sectional shapes of the first center sliding shafts 116A and 116B in the direction perpendicular to the insertion direction, and the shapes of the first center sliding bores 103 in the insertion direction may be polygonal shapes. In this case, the rigidity of the robot hand 10 when holding the target in the second direction can increase similarly to above.

E-3. Third Modified Example

Figure 13:
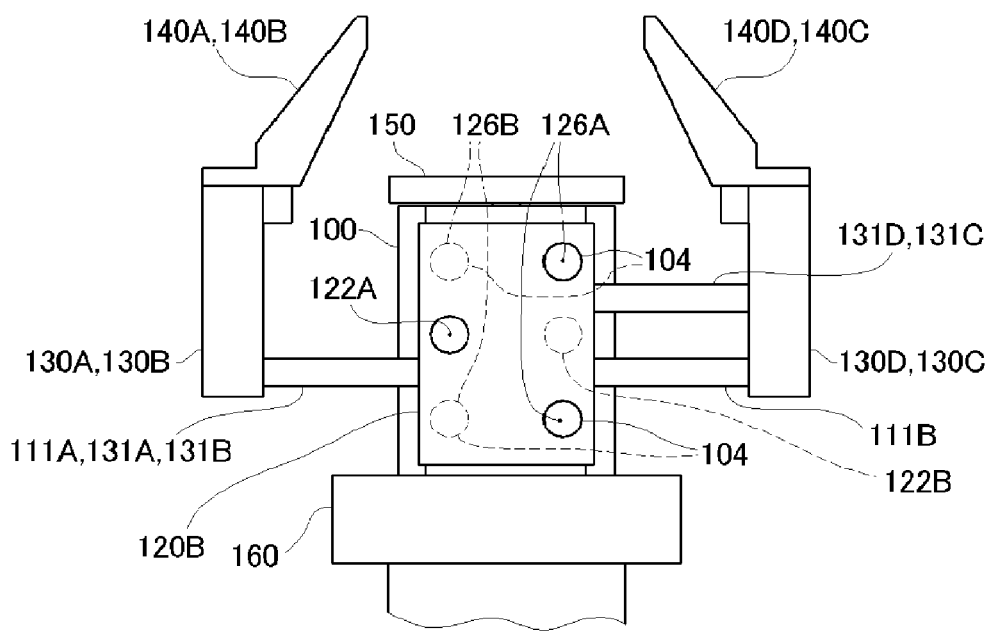
FIG. 13 illustrates an example of a robot hand according to a third modified example.

According to this embodiment described herein, only the one second center sliding shaft 126A projects from the second peripheral member 120A, while only the one second center sliding shaft 126B projects from the second peripheral member 120B. However, the number of the second center sliding shafts 126A and 126B projecting from the second peripheral members 120A and 120B is not limited one for each, but may be plural for each. For example, as illustrated in FIG. 13, the two second center sliding shafts 126A and the two second sliding shafts 126B may project from the second peripheral members 120A and 120B, respectively.

According to this structure, rotation of the second peripheral members 120A and 120B around the second center sliding shafts 126A and 126B, respectively, can be regulated. Accordingly, the rigidity of the robot hand 10 when holding the target in the first direction can increase.

A plural number of the first center sliding shafts 116A and a plural number of the first center sliding shafts 116B may be provided and extended from the first peripheral members 110A and 110B, respectively. According to this structure, rotation of the first peripheral members 110A and 110B around the first center sliding shaft 116A and the first center sliding shaft 116B can be regulated. Accordingly, the rigidity of the robot hand 10 when holding the target in the second direction can increase.

F. APPLICATION EXAMPLES

The robot hand 10 according to this embodiment and the modified examples is applicable to the following robots.

Figure 14:
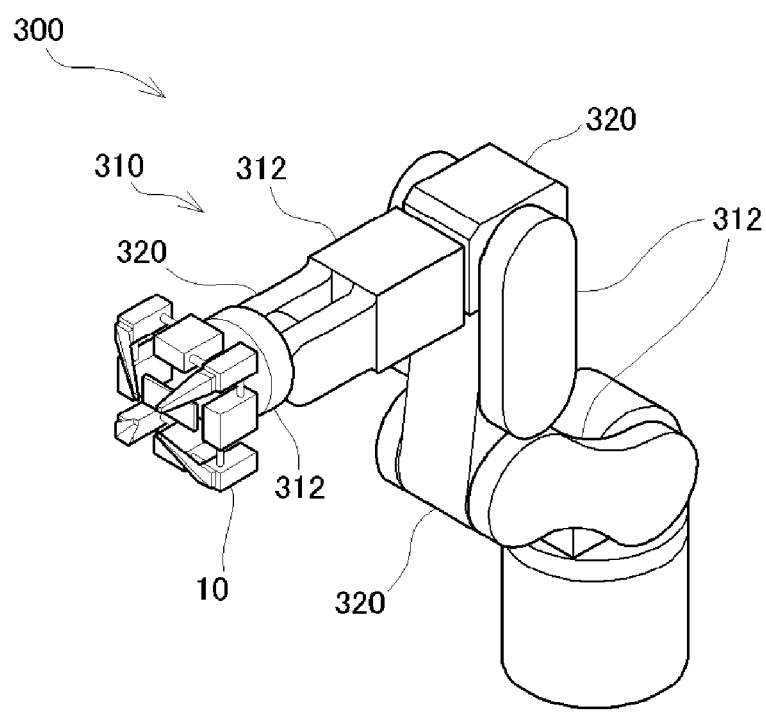
FIG. 14 illustrates an example of a single-arm robot provided with the robot hand.

FIG. 14 illustrates an example of a single-arm robot 300 provided with the robot hand 10. As illustrated in the figure, the robot 300 includes an arm 310 having a plurality of the link units 312, and joints 320 which connect the link units 312 in a condition so that the link units 312 can bend. The robot hand 10 is connected with the tip of the arm 310. According to this structure, the robot hand 10 can approach the position of the target by driving the arm 310 to hold the target.

Figure 15:
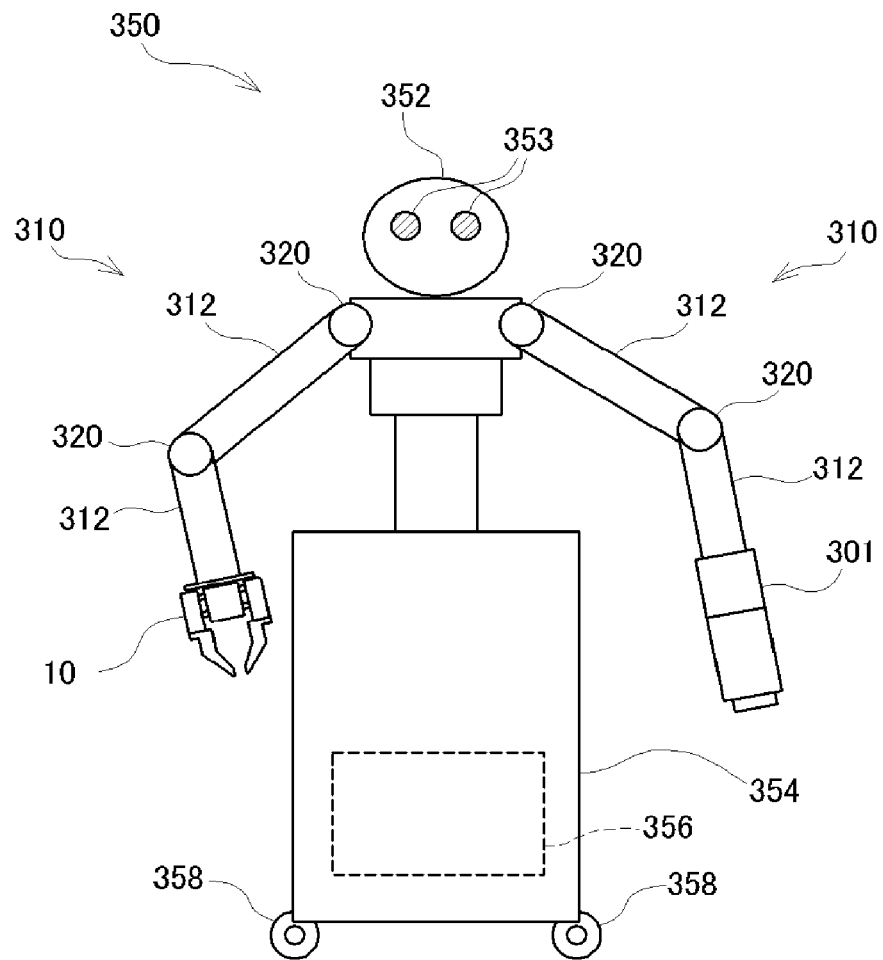
FIG. 15 illustrates an example of a plural-arm robot provided with the robot hand.

FIG. 15 illustrates a plural-arm robot 350 provided with the robot hand 10 as an example. As illustrated in the figure, the robot 350 includes a plurality of (two in the example shown in the figure) the arms 310 each of which has a plurality of the link units 312, and the joints 320 connecting the link units 312 in a manner so that the link units 312 can bend. The robot hand 10 and a tool 301 are connected with each tip of the arms 310. A plurality of cameras 353 are mounted on a head 352. A control unit 356 for controlling the overall operation is provided within a main body 354. Casters 358 are further equipped on the bottom surface of the main body 354 for transfer. According to the structure of the robot 350, the robot hands 10 can similarly approach the position of the target by driving the arms 310 to hold the target.

It is intended that the invention is not limited to the robot hands and robots described in the embodiment and modified examples herein, but may be practiced in various other forms without departing from the scope and spirit of the invention.

The entire disclosure of Japanese Patent Application No. 2012-138480 filed Jun. 20, 2012 is expressly incorporated by reference herein.

What is claimed is:

1. A robot hand, comprising:
a plurality of fingers which hold a target by changing clearances between the fingers;
a center member having a driving mechanism shifting the plurality of fingers;
a plurality of first peripheral members spaced apart from the center member in a first direction;
first driving shafts projecting in the first direction from the first peripheral members and connecting with the driving mechanism;
a plurality of second peripheral members spaced apart from the center member in a second direction crossing the first direction;
second driving shafts projecting in the second direction from the second peripheral member and connecting with the driving mechanism;
shift members disposed in the second direction with respect to the first peripheral members and in the first direction with respect to the second peripheral members, and supporting the fingers;
first sliding shafts projecting in the first direction from the shift members and slideably retained within first sliding bores formed in the second peripheral members;
second sliding shafts projecting in the second direction from the shift members and slideably retained within second sliding bores formed in the first peripheral members; and
a center sliding shaft projecting in the second direction from at least one of the second peripheral members and slideably retained within a center sliding bore formed in the center member.

2. The robot hand according to claim 1, wherein:
the center sliding shaft has a polygonal cross-section shape in a direction perpendicular to an insertion direction thereof; and
the center sliding bore has a polygonal shape in the direction perpendicular to the insertion direction.

3. The robot hand according to claim 1, wherein a plurality of center sliding shafts and a plurality of center sliding bores are provided.

4. The robot hand according to claim 1, wherein the center sliding shaft projects from each of the second peripheral members spaced apart from the center member in the second direction.

5. The robot hand according to claim 1, further comprising another center sliding shaft projecting in the first direction from at least one of the first peripheral members and slideably retained within another center sliding bore formed in the center member.

6. The robot hand according to claim 5, wherein:
the another center sliding shaft has a polygonal cross-section shape in the direction perpendicular to an insertion direction thereof; and
the another center sliding bore has a polygonal shape in the direction perpendicular to the insertion direction.

7. The robot hand according to claim 5, wherein a plurality of another center sliding shafts and a plurality of another center sliding bores are provided.

8. A robot, comprising a robot hand which includes:
a plurality of fingers which hold a target by changing clearances between the fingers;
a center member having a driving mechanism shifting the plurality of fingers;
a plurality of first peripheral members spaced apart from the center member in a first direction;
first driving shafts projecting in the first direction from the first peripheral members and connecting with the driving mechanism;
a plurality of second peripheral members spaced apart from the center member in a second direction crossing the first direction;
second driving shafts projecting in the second direction from the second peripheral member and connecting with the driving mechanism of the center member;
shift members disposed in the second direction with respect to the first peripheral members and in the first direction with respect to the second peripheral members, and supporting the fingers;
first sliding shafts projecting in the first direction from the shift members and slideably retained within first sliding bores formed in the second peripheral members;
second sliding shafts projecting in the second direction from the shift members and slideably retained within second sliding bores formed in the first peripheral members; and
a center sliding shaft projecting in the second direction from at least one of the second peripheral members and slideably retained within a center sliding bore formed in the center member.

9. The robot according to claim 8, wherein:
the center sliding shaft has a polygonal cross-section shape in a direction perpendicular to an insertion direction thereof; and
the center sliding bore has a polygonal shape in the direction perpendicular to the insertion direction.

10. The robot according to claim 8, wherein a plurality of center sliding shafts and a plurality of center sliding bores are provided.

11. The robot according to claim 8, wherein the center sliding shaft projects from each of the second peripheral members spaced apart from the center member in the second direction.

12. The robot according to claim 8, further comprising another center sliding shaft projecting in the first direction from at least one of the first peripheral members and slideably retained within another center sliding bore formed in the center member.

13. The robot according to claim 12, wherein:
the another center sliding shaft has a polygonal cross-section shape in the direction perpendicular to an insertion direction thereof; and
the another center sliding bore has a polygonal shape in the direction perpendicular to the insertion direction.

14. The robot according to claim 12, wherein a plurality of another center sliding shafts and a plurality of another center sliding bores are provided.

15. A holding mechanism, comprising:
a plurality of contact members which hold a target by changing clearances between the contact members;
a center member having a driving mechanism shifting the plurality of contact members;
a plurality of first peripheral members spaced apart from the center member in a first direction;
first driving shafts projecting in the first direction from the first peripheral members and connecting with the driving mechanism;
a plurality of second peripheral members spaced apart from the center member in a second direction crossing the first direction;
second driving shafts projecting in the second direction from the second peripheral member and connecting with the driving mechanism of the center member;
shift members disposed in the second direction with respect to the first peripheral members and in the first direction with respect to the second peripheral members, and supporting the contact members;
first sliding shafts projecting in the first direction from the shift members and slideably retained within first sliding bores formed in the second peripheral members;
second sliding shafts projecting in the second direction from the shift members and slideably retained within second sliding bores formed in the first peripheral members; and
a center sliding shaft projecting in the second direction from at least one of the second peripheral members and slideably retained within a center sliding bore formed in the center member.

16. The holding mechanism according to claim 15, wherein:
the center sliding shaft has a polygonal cross-section shape in a direction perpendicular to an insertion direction thereof; and
the center sliding bore has a polygonal shape in the direction perpendicular to the insertion direction.

17. The holding mechanism according to claim 15, wherein a plurality of center sliding shafts and a plurality of center sliding bores are provided.

18. The holding mechanism according to claim 15, wherein the center sliding shaft projects from each of the second peripheral members spaced apart from the center member in the second direction.

19. The holding mechanism according to claim 15, further comprising another center sliding shaft projecting in the first direction from at least one of the first peripheral members and slideably retained within another center sliding bore formed in the center member.

20. The holding mechanism according to claim 18, wherein a plurality of another center sliding shafts and a plurality of another center sliding bores are provided.

* * * * *